J. F. STEWARD.
REEL SUPPORT FOR HARVESTER.
No. 179,139. Patented June 27, 1876.
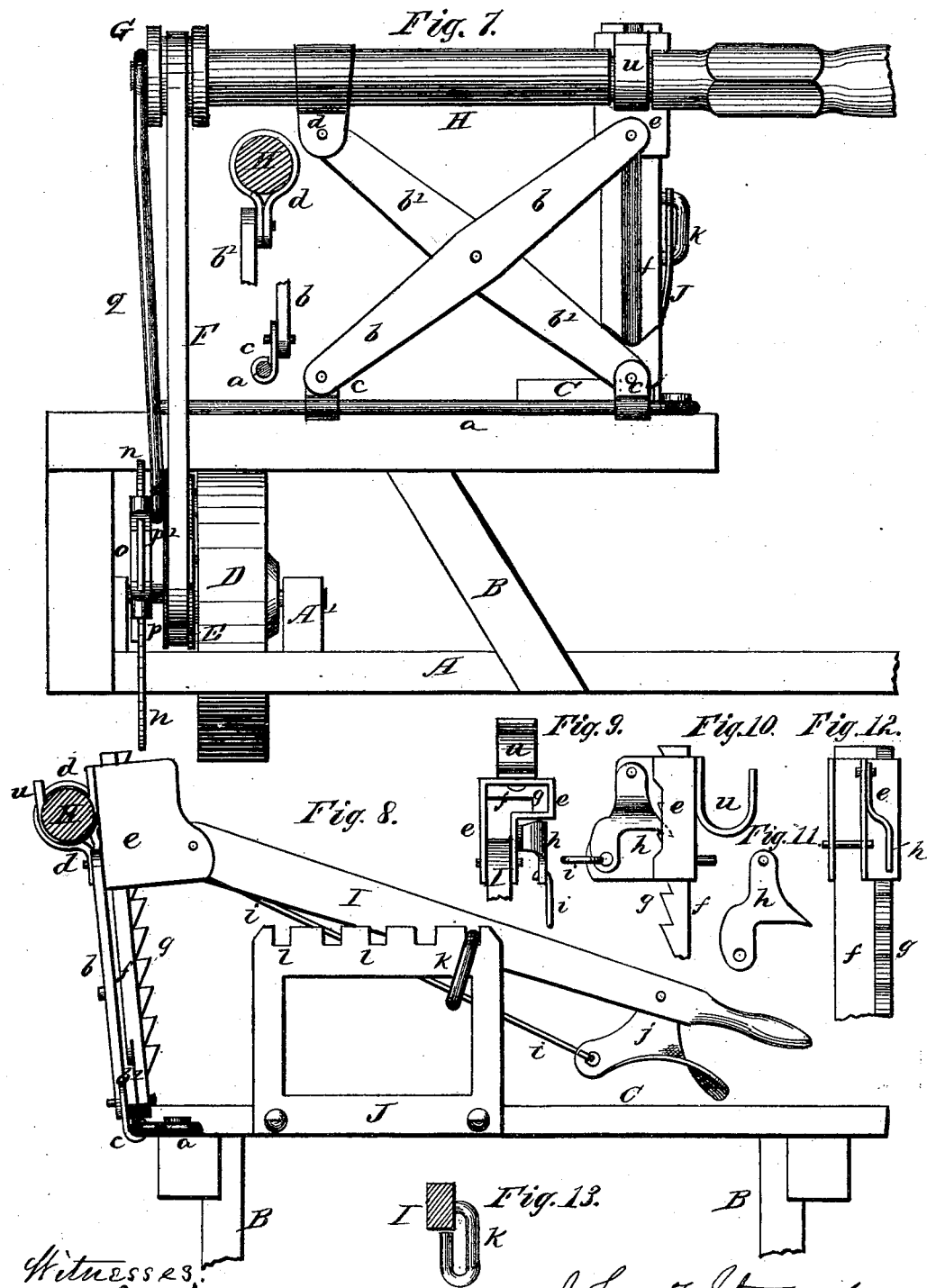

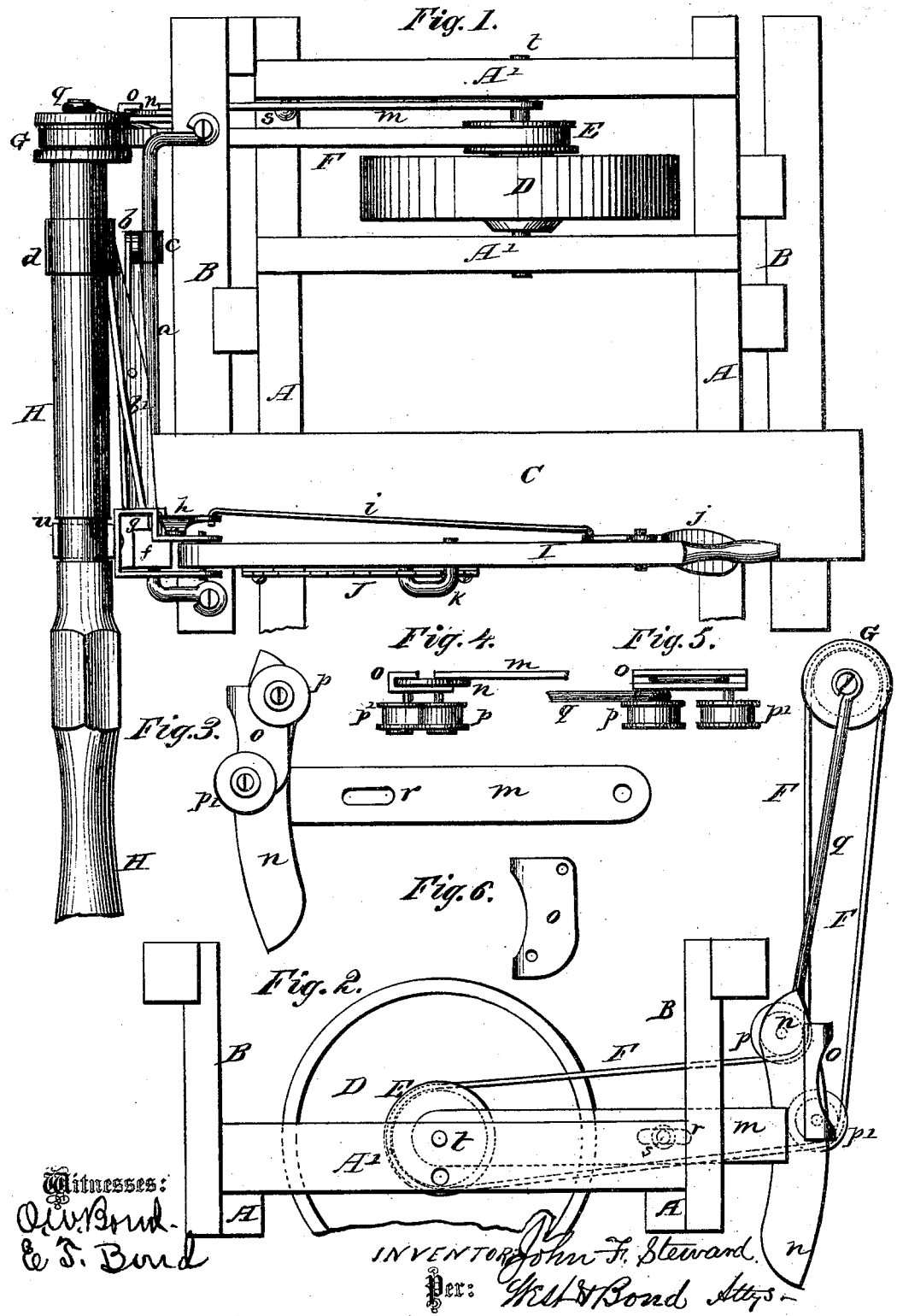

UNITED STATES PATENT OFFICE.

JOHN F. STEWARD, OF PLANO, ASSIGNOR TO ELIJAH H. GAMMON AND WILLIAM DEERING, OF CHICAGO, ILLINOIS.

IMPROVEMENT IN REEL-SUPPORTS FOR HARVESTERS.

Specification forming part of Letters Patent No. 179,139, dated June 27, 1876; application filed January 12, 1876.

*To all whom it may concern:*

Be it known that I, JOHN F. STEWARD, of Plano, Kendall county, State of Illinois, have invented new and useful Improvements in Reel-Supports for Harvesters, of which the following is a full description, reference being had to the accompanying drawings, in which—

Figure 1 is a top or plan view; Fig. 2, a side view, the reel and its raising and lowering devices being removed; Figs. 3, 4, 5, and 6, details of the belt-tightening devices; Fig. 7, a front view; Fig. 8, a side view, with the drive-wheel and belt-tightener removed; Fig. 9, a top view of the sliding bearing; Fig. 10, a side view of the same; Fig. 11, a detached view of the pawl; Fig. 12, a front view of the supporting-post; and Fig. 13, a cross-section of the hand-lever.

The object of this invention is to provide a reel-supporting device to a harvester, by which it may be raised and lowered, and adjusted front and rear, so as to enable the driver to adapt the reel to the varying conditions of grains, and which will be held in any position in which it may be placed; and its nature consists in the several parts and combination of parts hereinafter set forth and claimed as new.

In the drawings, A represents the main frame, which is extended out to receive an ordinary grain-carrier, as the reel, in the form shown, is designed to be applied to that class of machines in which the cut grain falls upon a carrier and is elevated into a receiver for binding, although it is applicable to other classes of reapers or harvesters; A', the cross-bars, between which the main or drive wheel is located; B, a portion of an elevator-frame; C, the board or cross-bar to which the driver's seat is usually attached; D, the main or drive wheel; E, the pulley or chain wheel, located on the axle of the main wheel; F, the belt or chain for driving the reel; G, the pulley or chain wheel of the reel-shaft; H, the reel-shaft; I, the hand-lever; J, the frame for holding the reel in its front and rear position; *a*, the rod or support to which the reel-supporting devices are pivoted at the lower end; *b' b'*, the cross-bars; *c*, the sliding pivot on the rod *a*; *d*, the sliding pivot or collar on the reel-shaft H; *e*, the sliding journal-support; *f*, the supporting-bar for the cross-bars *b b'*; *g*, the rack; *h*, the pawl; *i*, the rod for detaching the pawl; *j*, the lever or handle for operating the rod *i*; *k*, the link for keeping the hand-lever I in position, and also forming a stop and a pivot; *l*, the notches in the frame J for holding the reel in the position to which it is advanced or withdrawn by the driver or operator; *m*, the belt-tightener or take-up device, provided with a curved head, *n*; *o*, the plate sliding on the head *n*, and provided with anti-friction pulleys *p p'*; *q*, the bar depending from the reel-shaft H; *r*, the slot in bar *m*, through which the pivot *s* passes; *t*, the axle of the main or drive wheel; *u*, the journal-bearing of the reel-shaft.

In construction the frame A B C is made in any of the usual or well-known forms of machines which are provided with grain-carriers, elevators, and grain-cutting apparatus, and the main or drive wheel D is provided with the necessary gearing to operate a sickle, carrier, and elevator; but such parts are not herein shown or described, as they form no part of this invention. The axle *t* of the main or drive wheel D has its journal-bearings in the cross-bars A', and upon this shaft *t* is located a pulley or wheel, E, over which the belt F, which operates the reel, runs. The rod *a* is permanently attached to the frame B, as shown, at or about the same plane as the cross-bar C, to which the driver's seat is attached. To this rod *a* the rack and bar *f* is attached so as to swing back and forth thereon. This bar *f* is provided at one edge with a rack, *g*, which holds the journal-bearing support *e* in any position in which it may be placed. This support *e* is provided with the journal-bearing *u*, in which the reel-shaft H is placed.

The cross-bars *b b'* are pivoted together in the middle in the form of the device known as lazy-tongs. The lower end of the bar *b* is pivoted to the sliding collar *c*, which slips back and forth upon the rod *a*, as the reel is raised or lowered, and its upper end is pivoted to the sliding journal-bearing *e*. The lower end of the bar *b'* is pivoted to the supporting-bar *f*, and its upper end is pivoted to a collar, *d*, which slides back and forth upon the reel-shaft H, according as the reel is raised or lowered. The journal-support e, on the side opposite to its journal-bearing u, is provided with an extension, to which the hand-lever I is pivoted, which lever extends back far enough to be convenient to the driver when mounted upon his seat.

The reel is raised by depressing the hand end of the lever I, and is lowered by releasing the pawl h from the teeth or rack g, by means of the bell crank or hand-lever j. The pawl h, being constructed as shown in Figs. 11 and 12, readily engages with the rack g when the hand is released from the lever j, so as to leave the journal-support e in any position on the bar f at which it has been placed. As the reel is raised or lowered, the bars b b' open and close, and they also operate as braces to keep the reel-shaft H in its proper horizontal position. The reel is adjusted backward or forward by means of the loop-pin k on the hand-lever I, which engages with the notches l of the frame J. The loop k is loosely applied to the hand-lever I, so that it may be swung entirely over the corner of the frame J, and permanently lock the reel in position for traveling or for other purposes, and, as it slips along, the upper bar of the frame J firmly holds the lever I and the reel, when they have advanced as far forward as the frame J will permit, which prevents any slipping or miss on the part of the operator from letting the reel fall onto the ground.

In order to keep the band or chain F sufficiently taut to drive the reel, and permit of the adjustments stated, the pendant or arm q is hung from the reel-shaft H, near the driving-pulley G, as shown in Figs. 2 and 7. An arm or lever, m, is journaled to the axle t of the main or drive wheel, and is pivoted to the cross-bar A' at r, Figs. 1 and 2. This arm or lever m is provided with a curved head, n, upon which the plate o slides. The anti-friction wheels p p' are journaled on pins projecting from the sliding plate o, and around the journal or pin of the anti-friction wheel p the lower end of the rod passes, so that as the reel is raised or lowered, or adjusted front and rear, the arm q rises and falls, carrying with it the plate o and the anti-friction wheels p p' attached thereto, which preserves the distance between the pulleys or wheels E and G traveled by the belt or chain F, and keeps the belt or chain sufficiently taut to drive the wheel under all adjustments and circumstances.

In operation, the head e is readily raised and lowered upon the bar f, upon which it is mounted, and the reel is held in its horizontal position, and prevented from vibrating by means of the bars b b'. The reel is also readily adjusted forward or backward by the sliding loop k, which is attached to the hand-lever I, and which loop engages with the notches l on the top of the frame J.

This makes an easy operating and convenient device for adjusting the reel in all of the necessary directions.

It will be observed that the reel is actually supported by the lazy-tongs or cross-bars b b', the bar f with the rack g and pawl i serving the office of keeping the lazy-tongs in any desired position, and the position of this bar f may be changed without departing from my invention.

The loop k, while a convenience, is not a necessity. In place thereof a simple pin might be used, secured to the hand-lever I, which would operate as a pivot or fulcrum for the lever and a stop.

What I claim as new, and desire to secure by Letters Patent is as follows:

1. The combination of the bar f with the brace-bars b b', support a, reel-shaft H, and sliding head e, substantially as specified.

2. The link k on lever I, for engaging with the notches l, in combination with the frame J, for adjusting the reel, and preventing it from falling over, substantially as specified.

3. The arm m, provided with the head n, and sliding plate o provided with the anti-friction wheel p p', in combination with the rod q and reel-shaft H, substantially as and for the purpose specified.

JOHN F. STEWARD.

Witnesses:
E. A. WEST,
O. W. BOND.